(12) United States Patent
Ashok et al.

(10) Patent No.: US 9,043,644 B2
(45) Date of Patent: May 26, 2015

(54) USING SEPARATE PROCESSES TO HANDLE SHORT-LIVED AND LONG-LIVED JOBS TO REDUCE FAILURE OF PROCESSES

(71) Applicant: International Business Machines Corporation, Armonk, NY (US)

(72) Inventors: Rohith K. Ashok, Apex, NC (US); Roy F. Brabson, Raleigh, NC (US); Michael J. Burr, Cary, NC (US); Hugh E. Hockett, Raleigh, NC (US); Kristin R. Whetstone, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 13/693,456

(22) Filed: Dec. 4, 2012

(65) Prior Publication Data
US 2014/0157038 A1 Jun. 5, 2014

(51) Int. Cl.
G06F 11/00 (2006.01)
G06F 9/44 (2006.01)
G06F 11/07 (2006.01)

(52) U.S. Cl.
CPC .............. *G06F 9/44* (2013.01); *G06F 11/0793* (2013.01); *G06F 11/0715* (2013.01)

(58) Field of Classification Search
CPC .................................................. G06F 9/5038
See application file for complete search history.

(56) References Cited

U.S. PATENT DOCUMENTS

| 8,645,454 | B2 * | 2/2014 | Mathew .................... 709/201 |
| 2008/0115143 | A1 * | 5/2008 | Shimizu et al. .............. 718/105 |
| 2008/0276247 | A1 * | 11/2008 | Slomka et al. ............... 718/105 |
| 2011/0131580 | A1 | 6/2011 | Krishnamurthy et al. |
| 2011/0154360 | A1 * | 6/2011 | Kikuchi et al. .............. 718/106 |
| 2011/0276977 | A1 | 11/2011 | van Velzen et al. |
| 2012/0005682 | A1 * | 1/2012 | Doyle et al. ................ 718/102 |
| 2012/0166514 | A1 * | 6/2012 | Mathew .................... 709/201 |
| 2012/0216203 | A1 * | 8/2012 | Doyle et al. ................ 718/102 |

OTHER PUBLICATIONS

Mell et al., "The NIST Definition of Cloud Computing," Special Publication 800-145, Sep. 2011.
Kwak et al., "Task-Scheduling Strategies for Reliable TMR Controllers Using Task Grouping and Assignment," Reliability, IEEE Transactions, vol. 49, Issue 4, pp. 355-362, Dec. 2000, Abstract.

* cited by examiner

*Primary Examiner* — Christopher McCarthy
(74) *Attorney, Agent, or Firm* — Robert A. Voigt, Jr.; Winstead, P.C.

(57) ABSTRACT

A method, system and computer program product for reducing the failure of processes. After a job is received, a determination is made as whether the received job is a "short-lived job" or a "long-lived job." A short-lived job refers to a job who accomplishes a given task in less than a threshold period of time. A long-lived job refers to a job who accomplishes a given task in greater than a threshold period of time. For an identified long-lived job, the long-lived job is executed on a single process apart from other processes; whereas, the short-lived job is executed on at least one process separate from the processes executing long-lived jobs. As a result of executing the long-lived jobs on separate processes from the short-lived jobs, the likelihood of having a process fail is lessened since the duration of time that the process is running will be lessened.

17 Claims, 10 Drawing Sheets

USING SEPARATE PROCESSES TO HANDLE SHORT-LIVED AND LONG-LIVED JOBS TO REDUCE FAILURE OF PROCESSES

TECHNICAL FIELD

The present invention relates to processes in a computing system, and more particularly to using separate processes to handle short-lived and long-lived jobs to improve stability of the system.

BACKGROUND

A process is an instance of a computer program that is being executed. That is, a computer program is a passive collection of instructions and a process is the actual execution of those instructions. Depending on the operating system, a process may be made up of multiple threads of execution that execute instructions concurrently.

A process may fail for a variety of reasons. For example, there may be a software bug in the software running or in the underlying middleware or kernel software. A software bug is an error, flow, mistake, failure or fault in a computer program or system that produces an incorrect or unexpected result or causes it to behave in unintended ways.

A process may be designed to handle many types of "jobs," where a job refers to a set of functions that need to be completed in order to accomplish a given task (e.g., deploying a new instance of a virtual machine). If a process runs multiple jobs, then a software bug in one of the jobs may result in the entire process failing thereby causing the other jobs executing on the process to fail. Furthermore, a process that runs multiple jobs is more likely to run for an extended period of time thereby preventing the process from being recycled (i.e., stopped and restarted) which increases the chances of a process failure occurring.

As a result, running multiple jobs in the same process may increase the chances in the failure of both the process and the jobs executing on the process.

BRIEF SUMMARY

In one embodiment of the present invention, a method for reducing the failure of processes comprises identifying a first job as being a short-lived job, where a time duration of the short-lived job to be completed is less than a first threshold period of time. The method further comprises identifying a second job being a first long-lived job, where a time duration of the first long-lived job to be completed is greater than the first threshold period of time. Additionally, the method comprises executing the first long-lived job on a first process. In addition, the method comprises executing, by a processor, the short-lived job on at least one process separated from the first process executing the first long-lived job.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for reducing the failure of processes. In one embodiment of the present invention, after a job is received, a determination is made as whether the received job is a "short-lived job" or a "long-lived job." A short-lived job refers to a job whose set of functions that need to be completed to accomplish a given task takes less than a threshold period of time. A long-lived job refers to a job whose set of functions that need to be completed to accomplish a given task takes greater than a threshold period of time. For an identified long-lived job, the long-lived job is executed on a single process apart from other processes. For an identified short-lived job, the short-lived job is executed on at least one process separate from the processes executing long-lived jobs. As a result of executing the long-lived jobs on separate processes thereby separating the short-lived jobs from the long-lived jobs, the likelihood of having a process fail is lessened since the duration of time that the process is running will be lessened. In addition, by having a single long-lived job execute on a single process, the process can be recycled more quickly (i.e., stopped and restarted) thereby lessening the chances of a failure in the process. Furthermore, by having the long-lived jobs execute on separate processes, the failure of a process will only affect the single job being executed on the process and will not affect the other jobs executing on the other processes.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Figure 1:
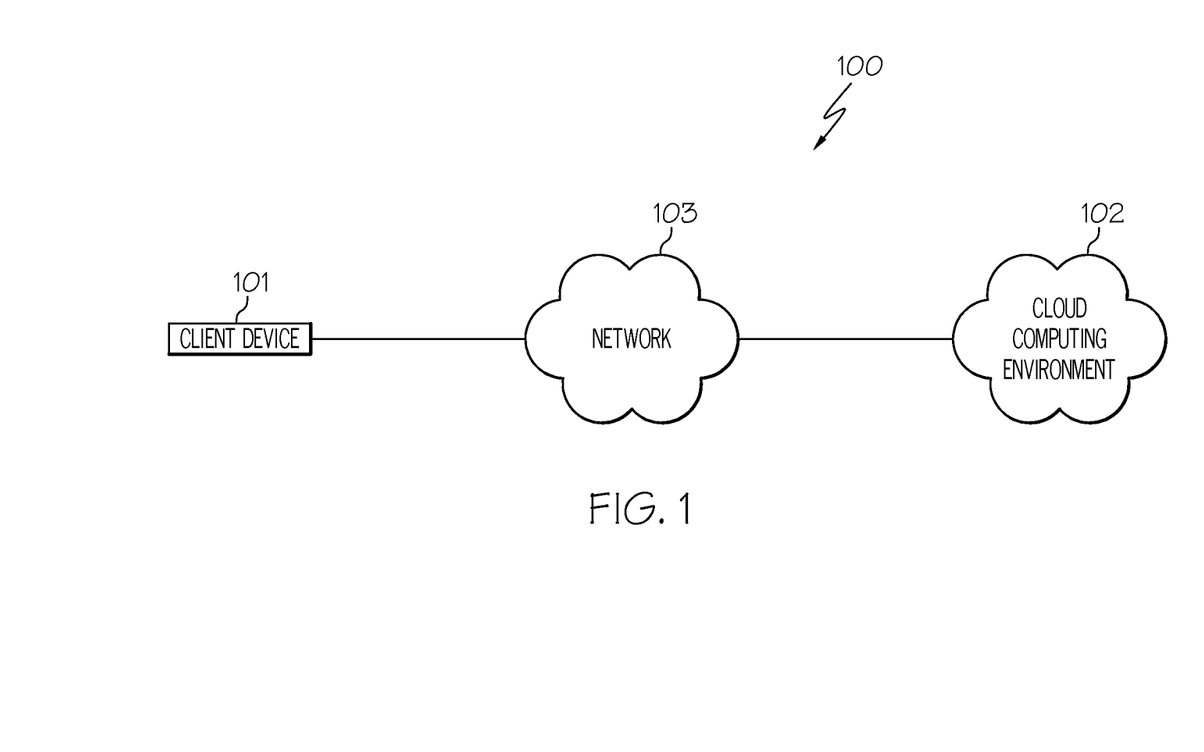
FIG. 1 illustrates a network system configured in accordance with an embodiment of the present invention.

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
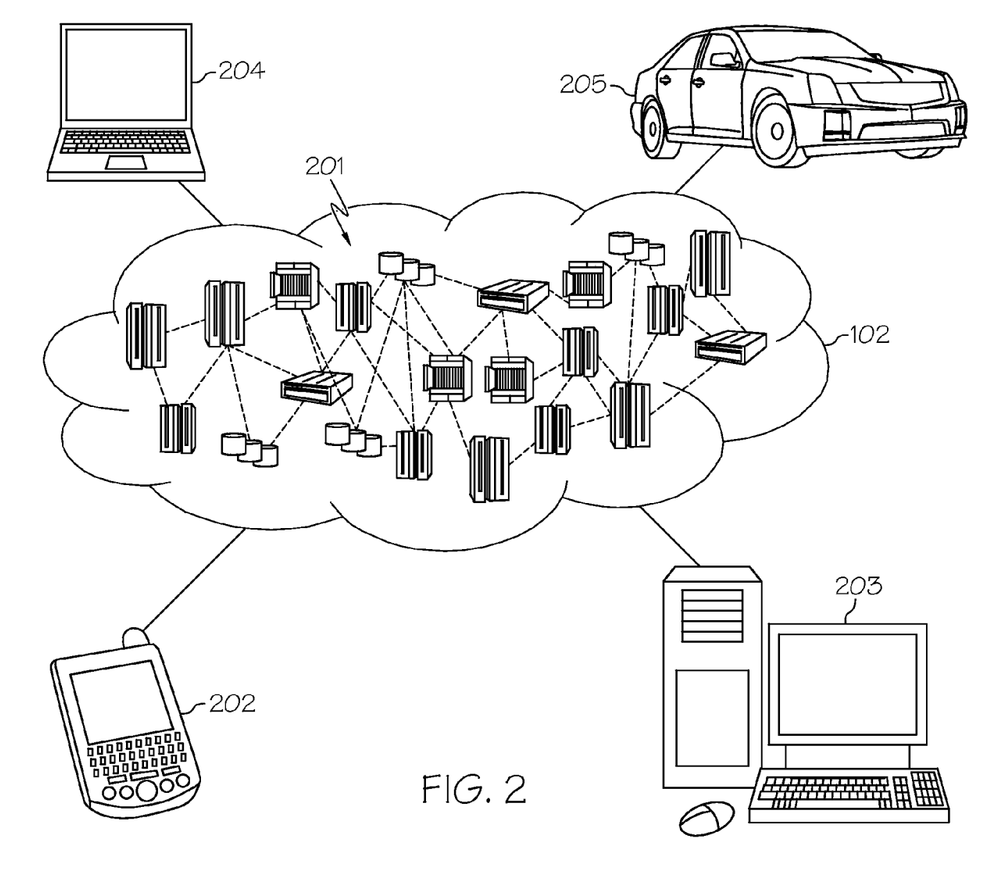
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. Cloud computing nodes 201 may include one or more racks of compute nodes (e.g., servers) that are managed by a server (referred to herein as the "administrative server") in cloud computing environment 102 as discussed below in greater detail in connection with FIG. 3.

It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
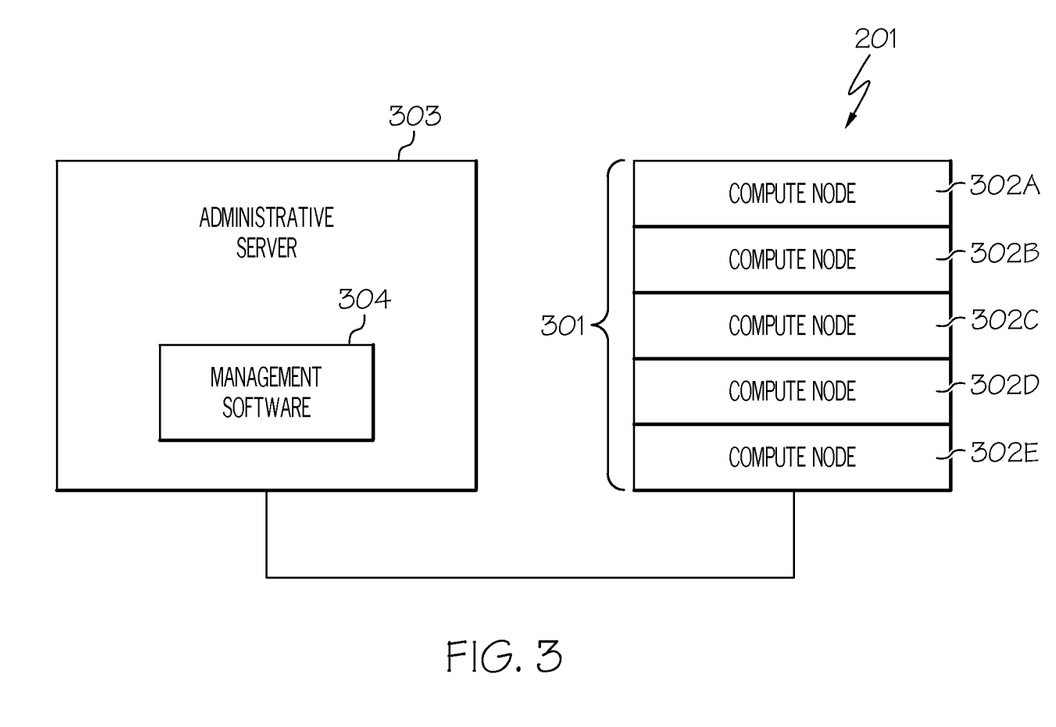
FIG. 3 illustrates a schematic of a rack of compute nodes of the cloud computing node(s) that is managed by an administrative server in accordance with an embodiment of the present invention.

Referring now to FIG. 3, FIG. 3 illustrates a schematic of a rack of compute nodes (e.g., servers) of cloud computing node(s) 201 that are managed by an administrative server in accordance with an embodiment of the present invention.

As shown, cloud computing node(s) 201 (also may be referred to as a "cluster") may include a rack 301 of hardware components or "compute nodes," such as servers or other electronic devices. For example, rack 301 houses compute nodes 302A-302E. Compute nodes 302A-302E may collectively or individually be referred to as compute nodes 302 or compute node 302, respectively. An illustrative virtualization environment for compute node 302 is discussed further below in connection with FIG. 4. FIG. 3 is not to be limited in scope to the number of racks 301 or compute nodes 302 depicted. For example, cloud computing node 201 may be comprised of any number of racks 301 which may house any number of compute nodes 302. Furthermore, while FIG. 3 illustrates rack 301 housing compute nodes 302, rack 301 may house any type of computing component that is used by cloud computing node 201. Furthermore, while the following discusses compute nodes 302 being confined in a designated rack 301, it is noted for clarity that compute nodes 302 may be distributed across cloud computing environment 102 (FIGS. 1 and 2).

As further shown in FIG. 3, rack 301 is coupled to an administrative server 303 configured to provide data center-level functions. Administrative server 303 supports a module, referred to herein as the management software 304, that can be used to manage all the compute nodes 302 of cloud computing nodes 201, monitor system utilization, intelligently deploy images of data and optimize the operations of cloud computing environment 102. Furthermore, management software 304 can be used to identify jobs as being "short-lived" jobs and "long-lived" jobs as well as to use separate processes to handle short-lived jobs and long-lived jobs so as to reduce the likelihood of a failure of a process as discussed further below. A description of the hardware configuration of administrative server 303 is provided further below in connection with FIG. 5.

Figure 4:
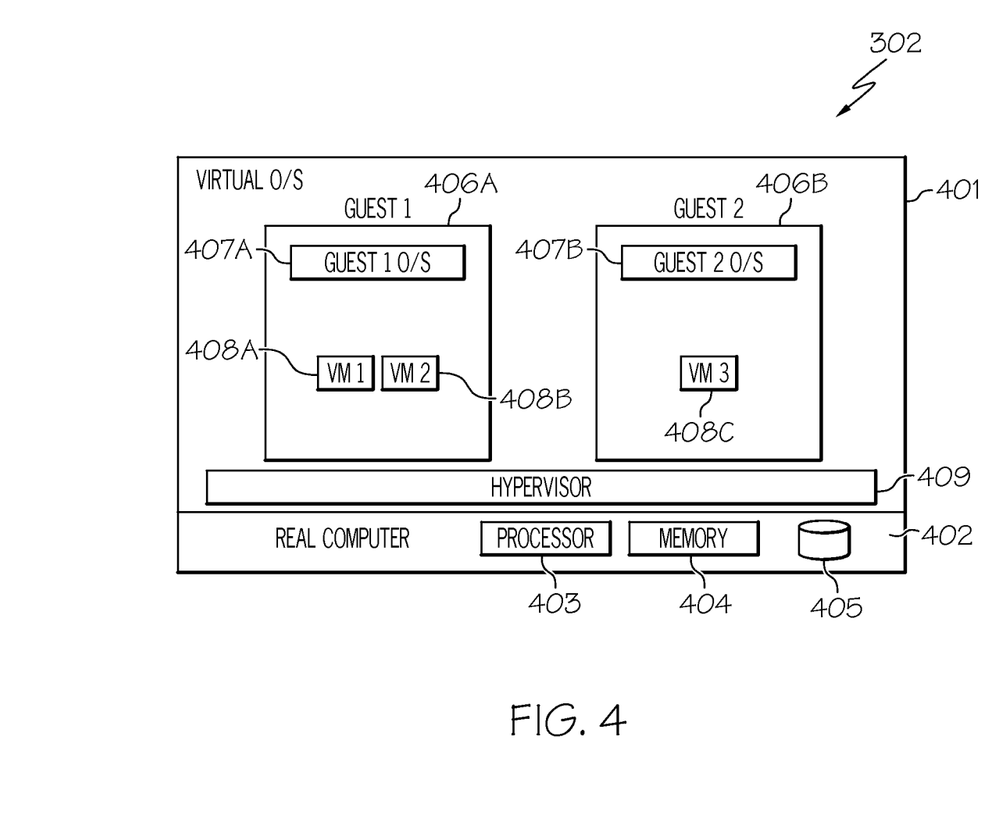
FIG. 4 illustrates a virtualization environment for a compute node in accordance with an embodiment of the present invention.

Referring now to FIG. 4, FIG. 4 illustrates a virtualization environment for compute node 302 (FIG. 3) in accordance with an embodiment of the present invention. Compute node 302 includes a virtual operating system 401. Operating system 401 executes on a real or physical computer 402. Real computer 402 includes one or more processors 403, a memory 404 (also referred to herein as the host physical memory), one or more disk drives 405 and the like. Other components of real computer 402 are not discussed herein for the sake of brevity.

Virtual operating system 401 further includes user portions 406A-406B (identified as "Guest 1" and "Guest 2," respectively, in FIG. 4), referred to herein as "guests." Each guest 406A, 406B is capable of functioning as a separate system. That is, each guest 406A-406B can be independently reset, host a guest operating system 407A-407B, respectively, (identified as "Guest 1 O/S" and "Guest 2 O/S," respectively, in FIG. 4) and operate with different programs. An operating system or application program running in guest 406A, 406B appears to have access to a full and complete system, but in reality, only a portion of it is available. Guests 406A-406B may collectively or individually be referred to as guests 406 or guest 406, respectively. Guest operating systems 407A-407B may collectively or individually be referred to as guest operating systems 407 or guest operating system 407, respectively.

Each guest operating system 407A, 407B may host one or more virtual machine applications 408A-408C (identified as "VM 1," "VM 2" and "VM 3," respectively, in FIG. 4), such as Java™ virtual machines. For example, guest operating system 407A hosts virtual machine applications 408A-408B. Guest operating system 407B hosts virtual machine application 408C. Virtual machines 408A-408C may collectively or individually be referred to as virtual machines 408 or virtual machine 408, respectively.

Virtual operating system 401 further includes a common base portion 409, referred to herein as a hypervisor. Hypervisor 409 may be implemented in microcode running on processor 403 or it may be implemented in software as part of virtual operating system 401. Hypervisor 409 is configured to manage and enable guests 406 to run on a single host.

As discussed above, virtual operating system 401 and its components execute on physical or real computer 402. These software components may be loaded into memory 404 for execution by processor 403.

The virtualization environment for compute node 302 is not to be limited in scope to the elements depicted in FIG. 4. The virtualization environment for compute node 302 may include other components that were not discussed herein for the sake of brevity.

Figure 5:
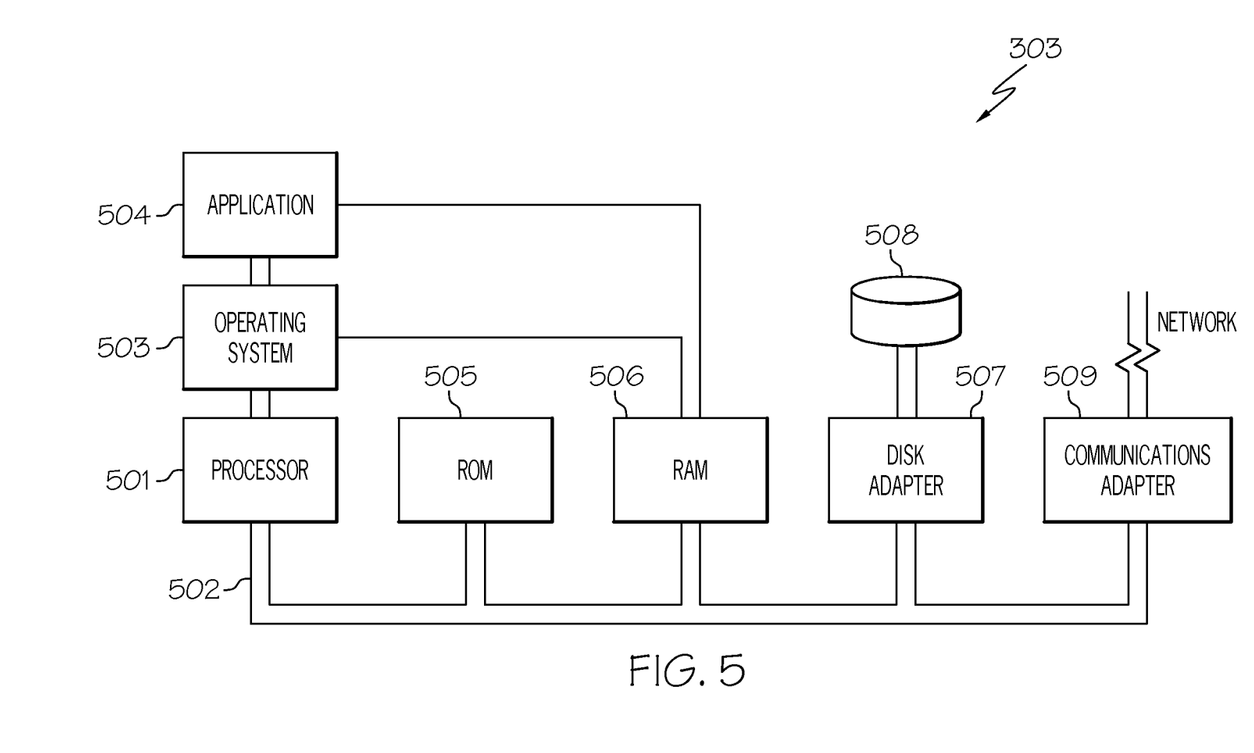
FIG. 5 illustrates a hardware configuration of an administrative server configured in accordance with an embodiment of the present invention.

Referring now to FIG. 5, FIG. 5 illustrates a hardware configuration of administrative server 303 (FIG. 3) which is representative of a hardware environment for practicing the present invention. Administrative server 303 has a processor 501 coupled to various other components by system bus 502. An operating system 503 runs on processor 501 and provides control and coordinates the functions of the various components of FIG. 5. An application 504 in accordance with the principles of the present invention runs in conjunction with operating system 503 and provides calls to operating system 503 where the calls implement the various functions or services to be performed by application 504. Application 504 may include, for example, a program for reducing the failure of processes by using separate processes to handle short-lived jobs and long-lived jobs as discussed further below in association with FIGS. 6, 7A-7B and 8-10.

Referring again to FIG. 5, read-only memory ("ROM") 505 is coupled to system bus 502 and includes a basic input/output system ("BIOS") that controls certain basic functions of administrative server 303. Random access memory ("RAM") 506 and disk adapter 507 are also coupled to system bus 502. It should be noted that software components including operating system 503 and application 504 may be loaded into RAM 506, which may be administrative server's 303 main memory for execution. Disk adapter 507 may be an integrated drive electronics ("IDE") adapter that communicates with a disk unit 508, e.g., disk drive. It is noted that the program for reducing the failure of processes by using separate processes to handle short-lived jobs and long-lived jobs, as discussed further below in association with FIGS. 6, 7A-7B and 8-10, may reside in disk unit 508 or in application 504.

Administrative server 303 may further include a communications adapter 509 coupled to bus 502. Communications adapter 509 interconnects bus 502 with an outside network (e.g., network 103 of FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, a process may be designed to handle many types of "jobs," where a job refers to a set of functions that need to be completed in order to accomplish a given task (e.g., deploying a new instance of a virtual machine). If a process runs multiple jobs, then a software bug in one of the jobs may result in the entire process failing thereby causing the other jobs executing on the process to fail. Furthermore, a process that runs multiple jobs is more likely to run for an extended period of time thereby preventing the process from being recycled (i.e., stopped and restarted) which increases the chances of a process failure occurring. As a result, running multiple jobs in the same process may increase the chances in the failure of both the process and the jobs executing on the process.

Figure 6:
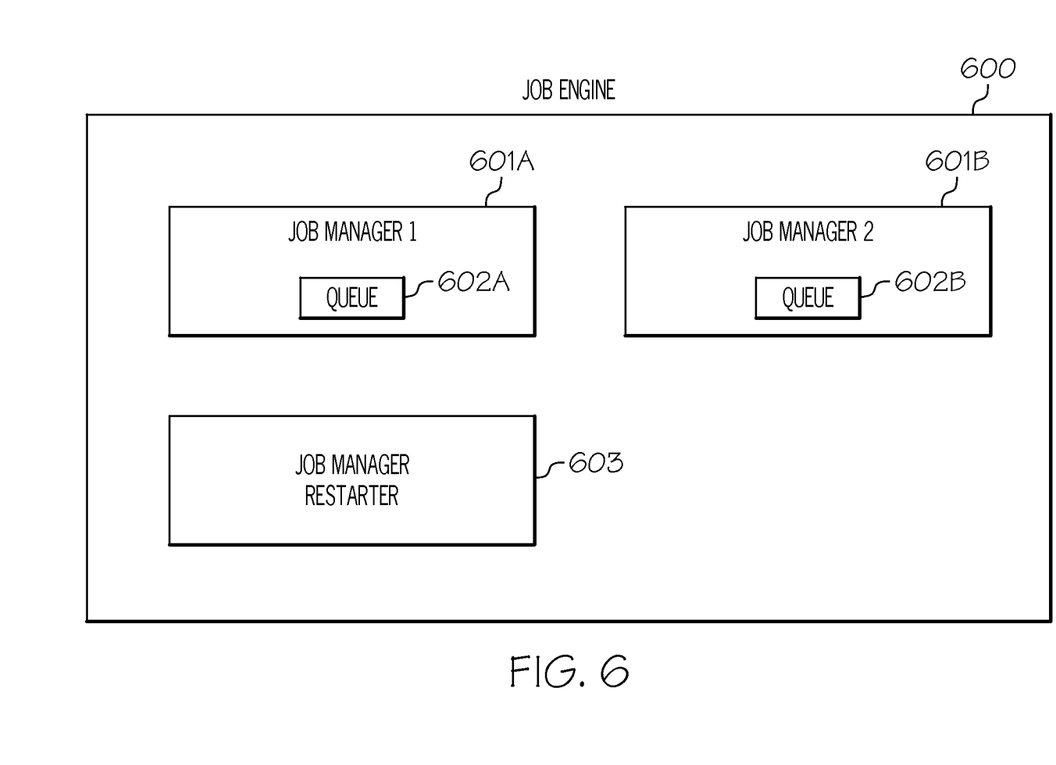
FIG. 6 illustrates the software components used in reducing the failure of processes in accordance with an embodiment of the present invention.
Figure 7A:
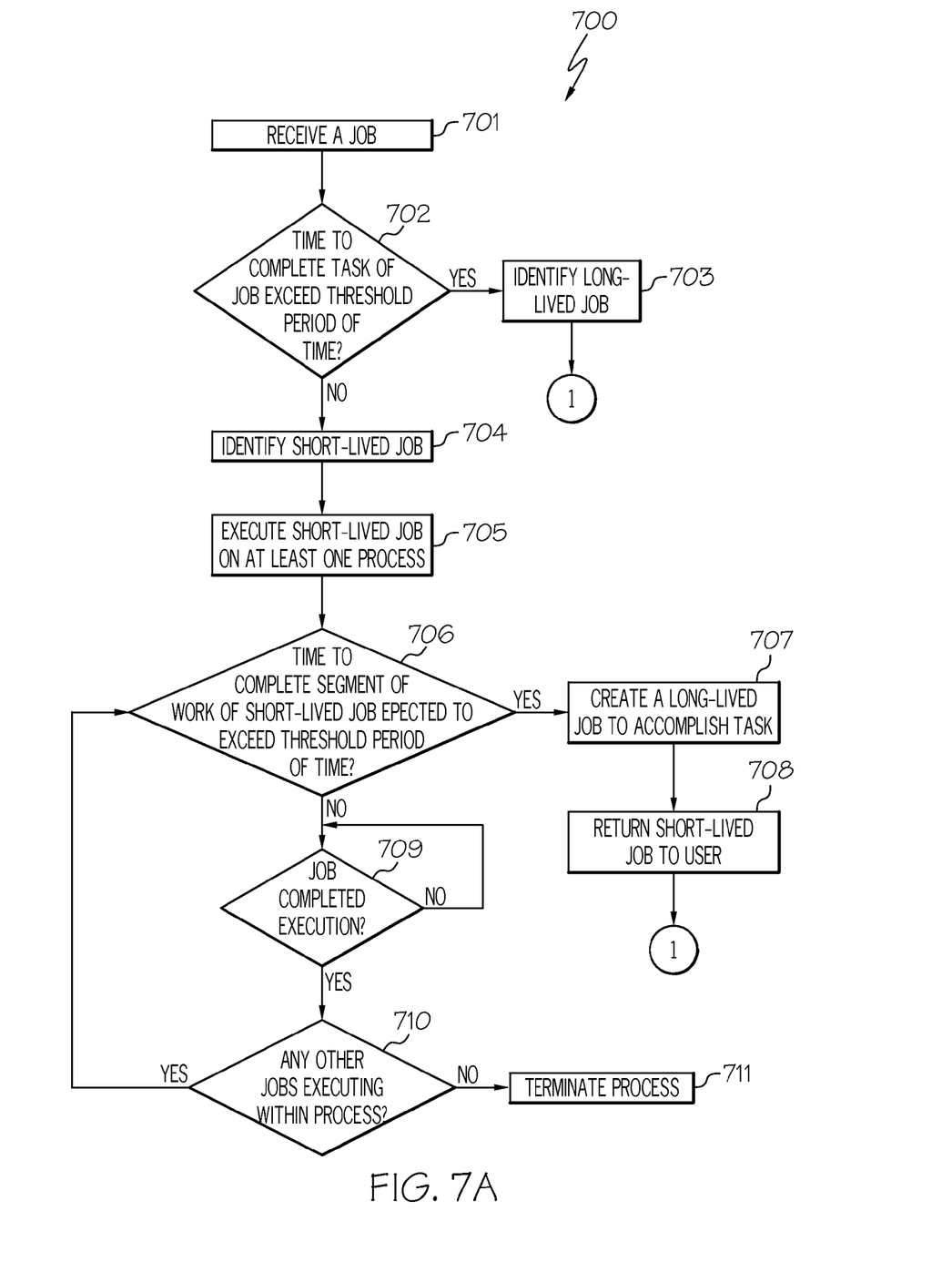
FIGS. 7A-7B are a flowchart of a method for reducing the failure of processes in accordance with an embodiment of the present invention.
Figure 7B:
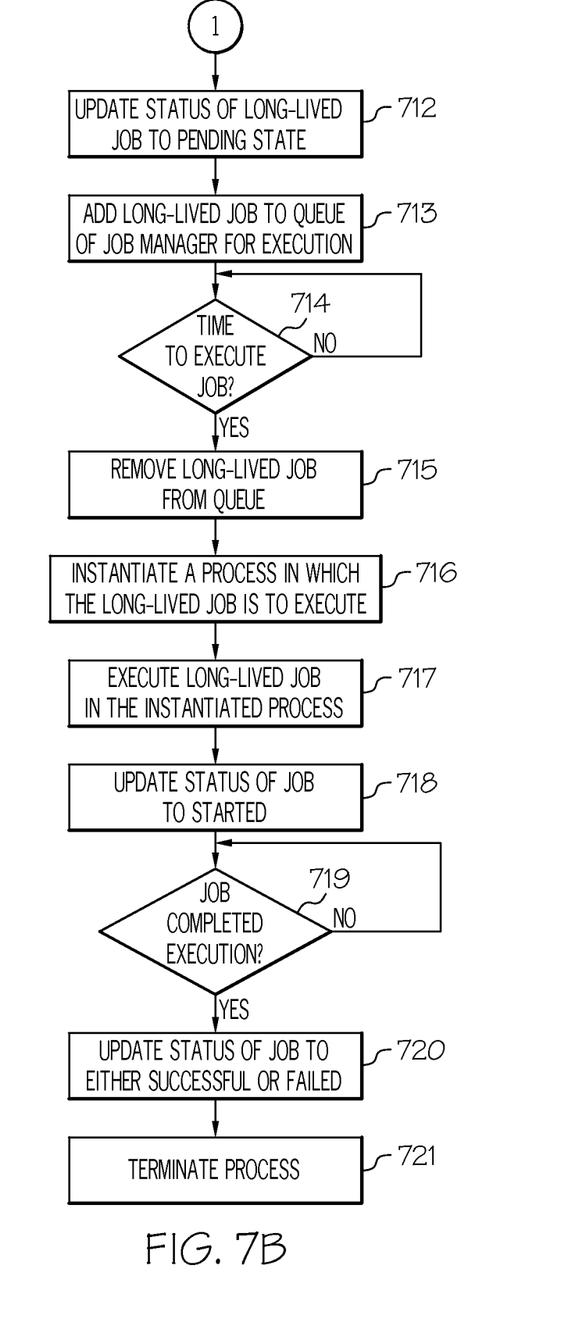
Figure 8:
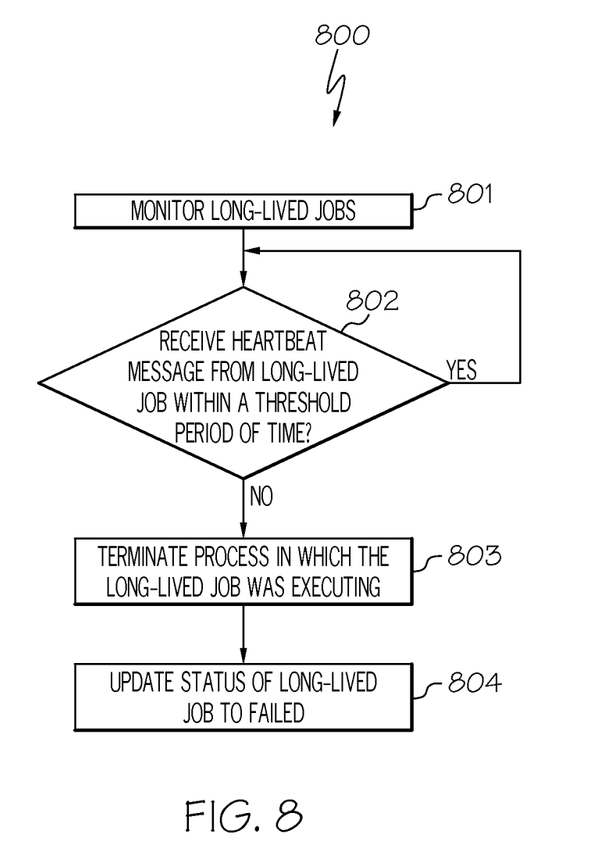
FIG. 8 is a flowchart of a method for monitoring long-lived jobs in accordance with an embodiment of the present invention.
Figure 9:
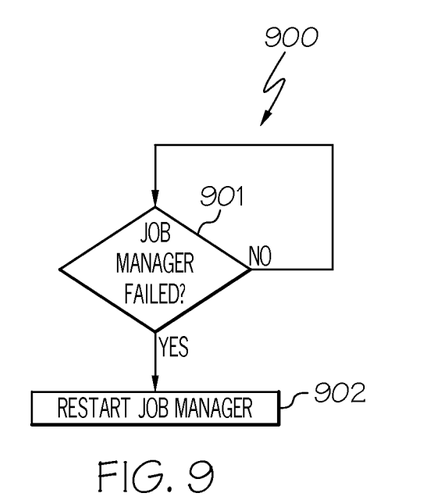
FIG. 9 is a flowchart of a method for handling the failure of a job manager in accordance with an embodiment of the present invention.
Figure 10:
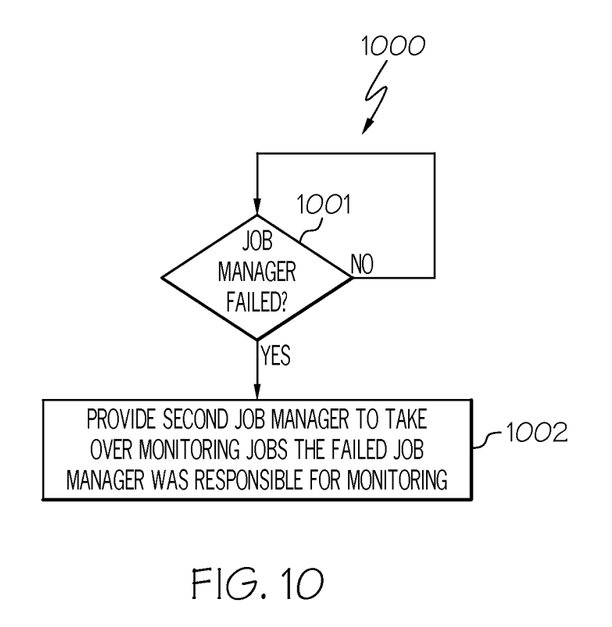
FIG. 10 is a flowchart of an alternative method for handling the failure of a job manager in accordance with an embodiment of the present invention.

The principles of the present invention provide a means for reducing the failure of processes by using separate processes to handle short-lived jobs and long-lived jobs as discussed further below in connection with FIGS. 6, 7A-7B and 8-10. FIG. 6 illustrates the software components used in reducing the failure of processes. FIGS. 7A-7B are a flowchart of a method for reducing the failure of processes. FIG. 8 is a flowchart of a method for monitoring long-lived jobs. FIG. 9 is a flowchart of a method for handling the failure of a job manager. FIG. 10 is a flowchart of an alternative method for handling the failure of a job manager.

Referring now to FIG. 6, as stated above, FIG. 6 is a diagram of the software components used in reducing the failure of processes in accordance with an embodiment of the present invention. In one embodiment, these software components may reside in application 504 (FIG. 5).

The following provides a brief description of these software components. A more detailed description of these software components is provided below in conjunction with FIGS. 7A-7B and 8-10, where their functionalities are discussed in connection with the method for reducing the failure of processes, the method for monitoring long-lived jobs and the methods for handling the failure of a job manager.

The software components used in reducing the failure of processes includes a job engine 600 configured to handle short-lived jobs and long-lived jobs. A short-lived job refers to a job whose set of functions that need to be completed to accomplish a given task takes less than a threshold period of time. A long-lived job refers to a job whose set of functions that need to be completed to accomplish a given task takes greater than a threshold period of time.

In one embodiment, the long-lived jobs are executed on separate processes as discussed further below in connection with FIGS. 7A-7B. As a result of executing the long-lived jobs on separate processes, the likelihood of having a process fail is lessened since the duration of time that the process is running will be lessened. Furthermore, by having the long-lived jobs being executed on separate processes, the failure of a process will only affect the single job being executed on the process and will not affect the other jobs executing on the other processes.

As illustrated in FIG. 6, job engine 600 includes a job manager 601A, 601B (job manager 601A is identified as "job manager 1" and job manager 601B is identified as "job manager 2" in FIG. 6). Job managers 601A-601B may collectively or individually be referred to as job managers 601 or job manager 601, respectively. In one embodiment, job manager 601 is configured to monitor the long-lived jobs to ensure they do not hang. In one embodiment, job manager 601 is configured to monitor a "heartbeat message" from the long-lived jobs to ensure they do not hang. In one embodiment, long-lived jobs periodically send heartbeat messages to job manager 601 to indicate they are still executing. If job manager 601 does not receive a heartbeat message within a threshold period of time, the process in which the long-lived job was executing is terminated by job manager 601 as discussed in further detail below in connection with FIG. 8.

Each job manager 601A-601B may include a queue 602A-602B, respectively, configured to hold long-lived jobs to be executed. Queues 602A-602B may collectively or individually be referred to as queues 602 or queue 602, respectively.

Furthermore, in one embodiment, job manager 601 may be a long-lived job itself and may fail. As a result, if job manager 601 has failed, job manager 601 may be restarted by a job manager restarter 603. Once restarted, the restarted job manager 601 will discover any running long-lived jobs that are still executing and job manager 601 will then begin its normal processing.

A method for reducing the failure of processes using the software components of FIG. 6 will now be discussed in connection with FIGS. 7A-7B. FIGS. 7A-7B are a flowchart of a method for reducing the failure of processes in accordance with an embodiment of the present invention.

Referring to FIG. 7A, in conjunction with FIGS. 1-6, in step 701, job engine 600 receives a job.

In step 702, a determination is made by job engine 600 as to whether the received job is a short-lived job or a long-lived job. As stated above, if the time for the job to complete its task is less than a threshold period of time, then the job is deemed to be "short-lived." If, however, the time for the job to complete its task is greater than a threshold period of time, then the job is deemed to be "long-lived."

If the duration of time to complete the task of the job exceeds the threshold period of time, then, in step 703, job engine 600 identifies a long-lived job. If, however, the duration of time to complete the task of the job does not exceed the threshold period of time, then, in step 704, job engine 600 identifies a short-lived job.

Upon identifying a short-lived job, job engine 600, in step 705, executes the short-lived job on at least one process separate from the processes executing long-lived jobs. By executing short-lived jobs separate from long-lived jobs, the likelihood of having a process fail is lessened since the duration of time that the process is running will be lessened.

In step 706, a determination is made by the short-lived job as to whether the time to complete a segment of work in the short-lived job is expected to exceed a threshold period of time. If the time to complete a segment of work in the short-lived job is expected to exceed a threshold period of time, then, in step 707, the short-lived job creates a long-lived job to perform the task. In step 708, job engine 600 returns the short-lived job to the user. For example, each REpresentational State Transfer (REST) Application Programming Interface (API) call that is received by management software 304 creates a short-lived job that runs on a thread within the process to which the request is sent. If the short-lived job determines that a segment of its work (e.g., deploying a new instance of a virtual machine) needs a greater time than a threshold period of time to complete, then the short-lived job creates a long-lived job to perform that task. The short-lived job then returns to the user with a Hypertext Transfer Protocol (HTTP) status code (accepted) and a Uniform Resource Identifier (URI) that may be used to query the status of the long-lived job that will perform the work. In one embodiment, the user may query the status of the long-lived job using this URI to determine when the job starts and whether it has completed successfully or has failed.

Referring to step 706, if the time to complete a segment of work in the short-lived job is not expected to exceed a threshold period of time, then, in step 709, a determination is made by job engine 600 as to whether the short-lived job has completed its execution.

If the short-lived job has not completed its execution, then job engine 600 continues to determine whether the short-lived job has completed its execution in step 709.

If, however, the short-lived job has completed its execution, then, in step 710, a determination is made by job engine 600 as to whether any other jobs are executing within the process. If there are other jobs executing within the process, then the executing short-lived job determines in step 706 as to whether the time to complete a segment of work in the short-lived job is expected to exceed a threshold period of time.

If, however, there are no other jobs executing within the process, then, in step 711, job engine 600 terminates the process. Upon terminating the process, the process can later be restarted thereby "recycling" the process.

Referring to FIG. 7B, in conjunction with FIGS. 1-6, upon returning the short-lived job to the user in step 708 or upon identifying the long-lived job in step 703, in step 712, job engine 600 updates the status of the long-lived job to "pending."

In step 713, job engine 600 adds the long-lived job to queue 602 of job manager 601 for execution. In step 714, job manager 601 determines whether it is time to execute the queued long-lived job.

If it is not time to execute the queued long-lived job, then job manager 601 continues to determine whether it is time to execute the queued long-lived job in step 714.

If, however, it is time to execute the queued long-lived job, then, in step 715, job manager 601 removes the long-lived job from queue 602. In step 716, job manager 601 instantiates a process in which the long-lived job is to execute.

In step 717, job manager 601 executes the long-lived job in the instantiated process. In step 718, job manager 601 updates the status of the long-lived job to "started" from "pending."

In step 719, a determination is made by job manager 601 as to whether the long-lived job has completed execution. If the long-lived job has not completed execution, then job manager 601 continues to determine whether the long-lived job has completed execution in step 719.

If, however, the long-lived job has completed execution, then, in step 720, job manager 601 updates the status of the long-lived job to either "successful" or "failed" depending on whether the job successfully completed its task or failed in completing its task. In step 721, job manager 601 terminates the process.

By having each long-lived job execute on separate processes, the likelihood of having a process fail, such as by a memory leak, is lessened since the duration of time that the process is running will be lessened. Furthermore, by having the long-lived jobs execute on separate processes, the failure of a process will only affect the single job being executed on the process and will not affect the other jobs executing on the other processes. In addition, by having a single long-lived job execute on a single process, the process can be recycled more quickly (i.e., stopped and restarted) thereby lessening the chances of a failure in the process.

In some implementations, method 700 may include other and/or additional steps that, for clarity, are not depicted. Further, in some implementations, method 700 may be executed in a different order presented and that the order presented in the discussion of FIGS. 7A-7B is illustrative. Additionally, in some implementations, certain steps in method 700 may be executed in a substantially simultaneous manner or may be omitted.

As discussed above, job manager 601 is configured to monitor long-lived jobs to ensure they do not hang. A description of such a monitoring process is provided below in connection with FIG. 8.

FIG. 8 is a flowchart of a method 800 for monitoring long-lived jobs in accordance with an embodiment of the present invention.

Referring to FIG. 8, in conjunction with FIGS. 1-6 and 7A-7B, in step 801, job manager 601 monitors the long-lived jobs executing on separate processes to ensure that the long-lived jobs do not hang.

In step 802, a determination is made for each long-lived job monitored by job manager 601 as to whether it received a heartbeat message from the long-lived job within a threshold period of time. In one embodiment, the long-lived job periodically sends heartbeat messages to job manager 601 to indicate they are still executing.

If job manager 601 receives a heartbeat message from the long-lived job within the threshold period of time, then job manager 601 continues to monitor the long-lived job and determine whether it received a subsequent heartbeat message from the long-lived job within a threshold period of time in step 802.

If, however, job manager 601 does not receive a heartbeat message form the long-lived job within the threshold period of time, then, in step 803, job manager 601 terminates the process in which the job was executing In step 804, job manager 601 updates the status of the long-lived job to "failed."

In some implementations, method 800 may include other and/or additional steps that, for clarity, are not depicted. Further, in some implementations, method 800 may be executed in a different order presented and that the order presented in the discussion of FIG. 8 is illustrative. Additionally, in some implementations, certain steps in method 800 may be executed in a substantially simultaneous manner or may be omitted.

As discussed above, job manager 601 may itself be a long-lived job and fail. A description of handling the failure of job manager 601 is provided below in connection with FIGS. 9-10.

FIG. 9 is a flowchart of a method 900 for handling the failure of job manager 601 (FIG. 6) in accordance with an embodiment of the present invention.

Referring to FIG. 9, in conjunction with FIGS. 1-6 and 7A-7B, in step 901, a determination is made by job manager restarter 603 as to whether job manager 601 has failed. If job manager 601 has not failed, then job manager restarter 603 continues to determine whether job manager 601 has failed in step 901.

If, however, job manager 601 has failed, then, in step 902, job manager restarter 603 restarts the failed job manager 601. The restarted job manager 601 will then discover any running long-lived jobs that are still executing and begin its normal processing in monitoring those long-lived jobs to ensure they do not hang.

In some implementations, method 900 may include other and/or additional steps that, for clarity, are not depicted. Further, in some implementations, method 900 may be executed in a different order presented and that the order presented in the discussion of FIG. 9 is illustrative. Additionally, in some implementations, certain steps in method 900 may be executed in a substantially simultaneous manner or may be omitted.

Another embodiment for handling the failure of job manager 601 involves the situation where two job managers 601 (e.g., job managers 601A-601B of FIG. 6) are both running in a mode referred to herein as the "active/active mode" as discussed below in connection with FIG. 10. In such an embodiment, the long-lived jobs will have the ability to send heartbeat messages to either of the job managers 601 in case it loses connectivity to one of the job managers 601 but wants to continue running.

FIG. 10 is a flowchart of an alternative method 1000 for handling the failure of job manager 601 (FIG. 6) in accordance with an embodiment of the present invention.

Referring to FIG. 10, in conjunction with FIGS. 1-6 and 7A-7B, in step 1001, a determination is made by job manager restarter 603 as to whether job manager 601 has failed. If job manager 601 has not failed, then job manager restarter 603 continues to determine whether job manager 601 has failed in step 1001.

If, however, job manager 601 (e.g., job manager 601A) has failed, then, in step 1002, job manager restarter 603 provides for the other job manager 601 (e.g., job manager 601B) to take over monitoring jobs the failed job manager 601 (e.g., job manager 601A) was responsible for monitoring.

While the foregoing discusses the use of two job managers 601 running in an active/active mode, any number of job managers 601 may be running to monitor long-lived jobs to ensure they do not hang thereby providing higher availability in case one of the job managers 601 failed. For example, if three job managers 601 are running in active mode, then the jobs monitored by the failed job manager 601 may be taken over by the remaining two job managers 601 still running.

In some implementations, method 1000 may include other and/or additional steps that, for clarity, are not depicted. Further, in some implementations, method 1000 may be executed in a different order presented and that the order presented in the discussion of FIG. 10 is illustrative. Additionally, in some implementations, certain steps in method 1000 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for reducing the failure of processes, the method comprising:
   identifying a first job as being a short-lived job, wherein a time duration of said short-lived job to be completed is less than a first threshold period of time;
   identifying a second job being a first long-lived job, wherein a time duration of said first long-lived job to be completed is greater than said first threshold period of time;
   executing said first long-lived job on a first process;
   executing, by a processor, said short-lived job on at least one process separated from said first process executing said first long-lived job;
   terminating said first process upon completion of said first long-lived job; and
   terminating one of said at least one process in response to no other jobs executing within said one of said at least one process.

2. The method as recited in claim 1 further comprising:
   creating a second long-lived job in response to a time to complete a segment of work in said short-lived job exceeding a second threshold period of time; and
   executing said second long-lived job in a second process separated from other processes.

3. The method as recited in claim 2 further comprising:
   returning said short-lived job to a user.

4. The method as recited in claim 1 further comprising:
   monitoring said first long-lived job executing on said first process by a first job manager; and
   terminating said first process in response to not receiving a heartbeat message from said first long-lived job within a second threshold period of time.

5. The method as recited in claim 4 further comprising:
   restarting said first job manager in response to said first job manager failing.

6. The method as recited in claim 4 further comprising:
   providing a second job manager to take over monitoring jobs said first job manager was responsible for monitoring in response to said first job manager failing.

7. A computer program product embodied in a non-transitory computer readable storage medium for reducing the failure of processes, the computer program product comprising the programming instructions for:
   identifying a first job as being a short-lived job, wherein a time duration of said short-lived job to be completed is less than a first threshold period of time;
   identifying a second job being a first long-lived job, wherein a time duration of said first long-lived job to be completed is greater than said first threshold period of time;
   executing said first long-lived job on a first process;
   executing said short-lived job on at least one process separated from said first process executing said first long-lived job;
   terminating said first process upon completion of said first long-lived job; and
   terminating one of said at least one process in response to no other jobs executing within said one of said at least one process.

8. The computer program product as recited in claim 7 further comprising the programming instructions for:
   creating a second long-lived job in response to a time to complete a segment of work in said short-lived job exceeding a second threshold period of time; and
   executing said second long-lived job in a second process separated from other processes.

9. The computer program product as recited in claim 8 further comprising the programming instructions for:
   returning said short-lived job to a user.

10. The computer program product as recited in claim 7 further comprising the programming instructions for:
    monitoring said first long-lived job executing on said first process by a first job manager; and
    terminating said first process in response to not receiving a heartbeat message from said first long-lived job within a second threshold period of time.

11. The computer program product as recited in claim 10 further comprising the programming instructions for:
    restarting said first job manager in response to said first job manager failing.

12. The computer program product as recited in claim 10 further comprising the programming instructions for:
    providing a second job manager to take over monitoring jobs said first job manager was responsible for monitoring in response to said first job manager failing.

13. A system, comprising:
    a memory unit for storing a computer program for reducing the failure of processes; and
    a processor coupled to said memory unit, wherein said processor, responsive to said computer program, comprises:
       circuitry for identifying a first job as being a short-lived job, wherein a time duration of said short-lived job to be completed is less than a first threshold period of time;

circuitry for identifying a second job being a first long-lived job, wherein a time duration of said first long-lived job to be completed is greater than said first threshold period of time;
circuitry for executing said first long-lived job on a first process;
circuitry for executing said short-lived job on at least one process separated from said first process executing said first long-lived job;
circuitry for terminating said first process upon completion of said first long-lived job; and
circuitry for terminating one of said at least one process in response to no other jobs executing within said one of said at least one process.

14. The system as recited in claim 13, wherein said processor further comprises:
circuitry for creating a second long-lived job in response to a time to complete a segment of work in said short-lived job exceeding a second threshold period of time; and
circuitry for executing said second long-lived job in a second process separated from other processes.

15. The system as recited in claim 13, wherein said processor further comprises:
circuitry for monitoring said first long-lived job executing on said first process by a first job manager; and
circuitry for terminating said first process in response to not receiving a heartbeat message from said first long-lived job within a second threshold period of time.

16. The system as recited in claim 15, wherein said processor further comprises:
circuitry for restarting said first job manager in response to said first job manager failing.

17. The system as recited in claim 15, wherein said processor further comprises:
circuitry for providing a second job manager to take over monitoring jobs said first job manager was responsible for monitoring in response to said first job manager failing.

* * * * *